UNITED STATES PATENT OFFICE.

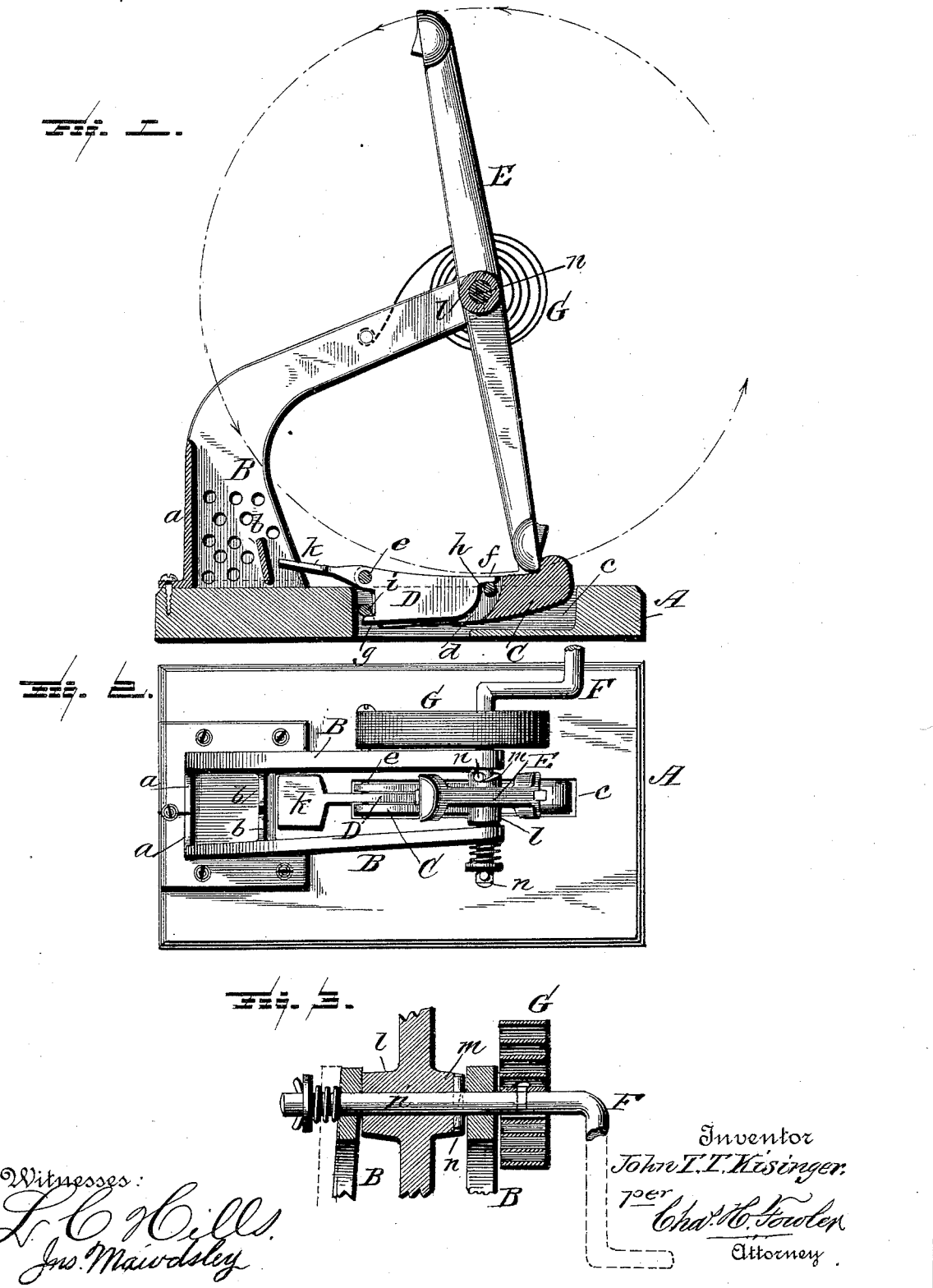

JOHN TETAR TILMON KISINGER, OF BELTON, MISSOURI.

ANIMAL-TRAP.

SPECIFICATION forming part of Letters Patent No. 462,715, dated November 10, 1891.

Application filed July 15, 1891. Serial No. 399,656. (No model.)

*To all whom it may concern:*

Be it known that I, JOHN TETAR TILMON KISINGER, a citizen of the United States, residing at Belton, in the county of Cass and State of Missouri, have invented certain new and useful Improvements in Animal-Traps; and I do hereby declare that the following is a full, clear, and exact description of the same, reference being had to the annexed drawings, making a part of this specification, and to the letters of reference marked thereon.

Figure 1 of the drawings represents a sectional elevation of my improved animal-trap; Fig. 2, a top plan view thereof; Fig. 3, a detail view, partly in section, showing the ratchet upon the hub of the hammer, the spring, and crank-handle connection.

The present invention has relation to that class of animal-traps for which a patent was granted to me April 7, 1891, No. 449,857, and is designed as an improvement thereon; and it consists in the several details of construction, substantially as shown in the drawings, and hereinafter described and claimed.

In the accompanying drawings, A represents a suitable base or support to which the operating parts of the trap are connected, and may be of any suitable size and shape found best adapted to the purpose. To this base or support are connected by screws, bolts, or other like means the curved arms B, which arms at or near their base are cast with lateral flanges $a$. When the arms are connected to the base or support these flanges will come together and not only serve the purpose as stops, but close the space between the arms a certain distance to form a receptacle for the bait. If desired, however, the base or support A and the arms B may be cast in one piece in order to cheapen the construction of the trap and also increase its strength, which change I reserve the right to make without departing from the principle of my invention. Lugs $b$ may extend laterally from the inner sides of the arms B to partially close the receptacle for the bait formed by the flanges $a$.

Within a recess $c$ in the base or support A is suitably pivoted a latch C, which has an open slot $d$ at its inner end, within which is located the trip D, said trip being pivoted at $e$ to the inner end of the latch, as shown in Fig. 1. The trip D has bearing-fingers $f$ $g$, which bear respectively against the pivot-rod $h$, which connects the latch C to the base or support A and the transverse rod $i$, respectively, both rods, as will be seen, being located within the recess $c$ and extending across the same. The trip D terminates at its inner end in a flat bearing-plate $k$, upon which the animal is supposed to walk in the endeavor to obtain access to the bait in the receptacle or space between the arms B, which pressure upon the plate will spring the trap, as will be more fully described hereinafter.

The double-headed hammer E may be of any suitable construction and variously modified as circumstances may require, depending entirely upon what class of animal the trap is to be used for. This hammer has a central hub $l$, through which passes the shaft of the crank-handle F, and also through the upper ends of the arms B, which holds the hub with its hammer-arms between the arms B above referred to. One side of this hub is provided with a ratchet $m$, with which engages a pin $o$ upon the shaft $n$ of the crank-handle F, and to this shaft is attached one end of a coil-spring G, the other or opposite end being suitably attached to the side of one of the arms B, as shown.

In setting the trap the spring is first wound up by the crank-handle above described, which is turned in the opposite direction to the direction in which the arrows point, as shown in Fig. 1, the ratchet upon the hub of the double-headed hammer admitting of the shaft of the crank-handle with its pin being turned without turning or carrying with it the double-headed hammer; but when the shaft is turned in opposite directions, as indicated by the arrows, through the action of the spring, the double-headed hammer will be carried around with it. Now when the spring is properly wound and the trap set ready for action, the head of one of the hammer-arms will engage with the shouldered end of the latch and the bearing-fingers of the trip will be engaged with the transverse rods hereinbefore described. The position of the double-headed hammer, the latch, and the trip, when the trap is set, are shown in Fig.

1 of the drawings. The fingers, as will be seen, which are on the opposite ends of the trip, serve in connection with the transverse rods, against which they bear, to hold the latch up against the head of the hammer in the position shown. Now in this position the trap is ready for use, and should any pressure come on the bearing-plate of the trip it would release the latch, and by the action of the coiled spring the head of the hammer would be brought down with sufficient force upon the animal to kill or cripple it. Upon the end of the shaft $n$ is a coiled spring $r$, which ends bear, respectively, against the side of one of the arms B and a washer $s$, the object of which is to keep the ratchet end of the hub $m$ in engagement with the pin $n$ on the shaft.

Having now fully described my invention, what I claim as new, and desire to secure by Letters Patent, is—

1. In an animal-trap, the combination, with a suitable base or support, and arms extending up therefrom, and a latch and trip, of a double-headed hammer having a central hub with ratchet, a shaft with crank-handle extending therethrough, and pin on the shaft to engage with the ratchet, and a coiled spring having its ends connected, respectively, to the shaft and one of the arms extending up from the base or support, substantially as and for the purpose set forth.

2. In an animal-trap, the combination, with a suitable base or support, arms extending therefrom, a double-headed hammer, and a spring for operating same, of a pivoted and shouldered latch, and a pivoted trip having at its opposite ends bearing-fingers, and the transverse rods against which they come in contact to retain the latch in engagement with the head of the hammer, substantially as and for the purpose specified.

3. In an animal-trap, a suitable base or support, arms extending therefrom, a double-headed hammer pivoted to said arms, and a spring to operate the hammer, in combination with a shouldered and slotted latch pivoted within a recess in the base or support, a trip pivoted to the latch and located within the slot thereof, and having bearing-fingers at its opposite ends, and transverse rods with which they engage, substantially as and for the purpose described.

In testimony that I claim the above I have hereunto subscribed my name in the presence of two witnesses.

JOHN TETAR TILMON KISINGER.

Witnesses:
W. H. STROTHER,
S. D. SPRINKLE, Jr.